United States Patent
Lai

(10) Patent No.: US 7,987,389 B2
(45) Date of Patent: Jul. 26, 2011

(54) SYSTEM AND METHOD FOR TESTING SLEEP AND WAKE FUNCTIONS OF COMPUTER

(75) Inventor: Wen-Bin Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/752,161

(22) Filed: Apr. 1, 2010

(65) Prior Publication Data

US 2011/0066888 A1    Mar. 17, 2011

(30) Foreign Application Priority Data

Sep. 11, 2009   (CN) .......................... 2009 1 0306874

(51) Int. Cl.
    *G06F 11/00*    (2006.01)

(52) U.S. Cl. ......................................................... 714/32
(58) Field of Classification Search ..................... 714/32
    See application file for complete search history.

(56) References Cited

U.S. PATENT DOCUMENTS

| 6,122,748 A * | 9/2000 | Hobson ........................ 713/323 |
| 2005/0278560 A1* | 12/2005 | Wu ............................... 713/320 |
| 2010/0332212 A1* | 12/2010 | Finkelman ..................... 703/23 |

* cited by examiner

*Primary Examiner* — Scott T Baderman
*Assistant Examiner* — Jigar Patel
(74) *Attorney, Agent, or Firm* — Frank R. Niranjan

(57) ABSTRACT

A system for testing sleep and wake functions of a computer includes a test device and a test software installed on a motherboard of the computer. The test device includes a timing module, a counting module, and a switch module. The test software includes an initialization unit, a signal transmission unit, and a comparison unit. The test device communicates with the motherboard, and an operation system of the computer sets that receiving a control signal means executing an operation of putting the computer to sleep or waking the computer up. The system employs the test software cooperating with the test device to test sleep and wake functions of the computer automatically.

11 Claims, 3 Drawing Sheets

SYSTEM AND METHOD FOR TESTING SLEEP AND WAKE FUNCTIONS OF COMPUTER

BACKGROUND

1. Technical Field

The present disclosure relates to test systems and methods, and particularly to a system and a method for testing sleep and wake functions of a computer.

2. Description of Related Art

To ensure quality of a computer, a variety of ways are adopted to test sleep and wake functions. The common method of manual testing involving, for example, pressing a power button of the computer, repeatedly, that puts the computer to sleep and wakes it up is too labor intensive.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
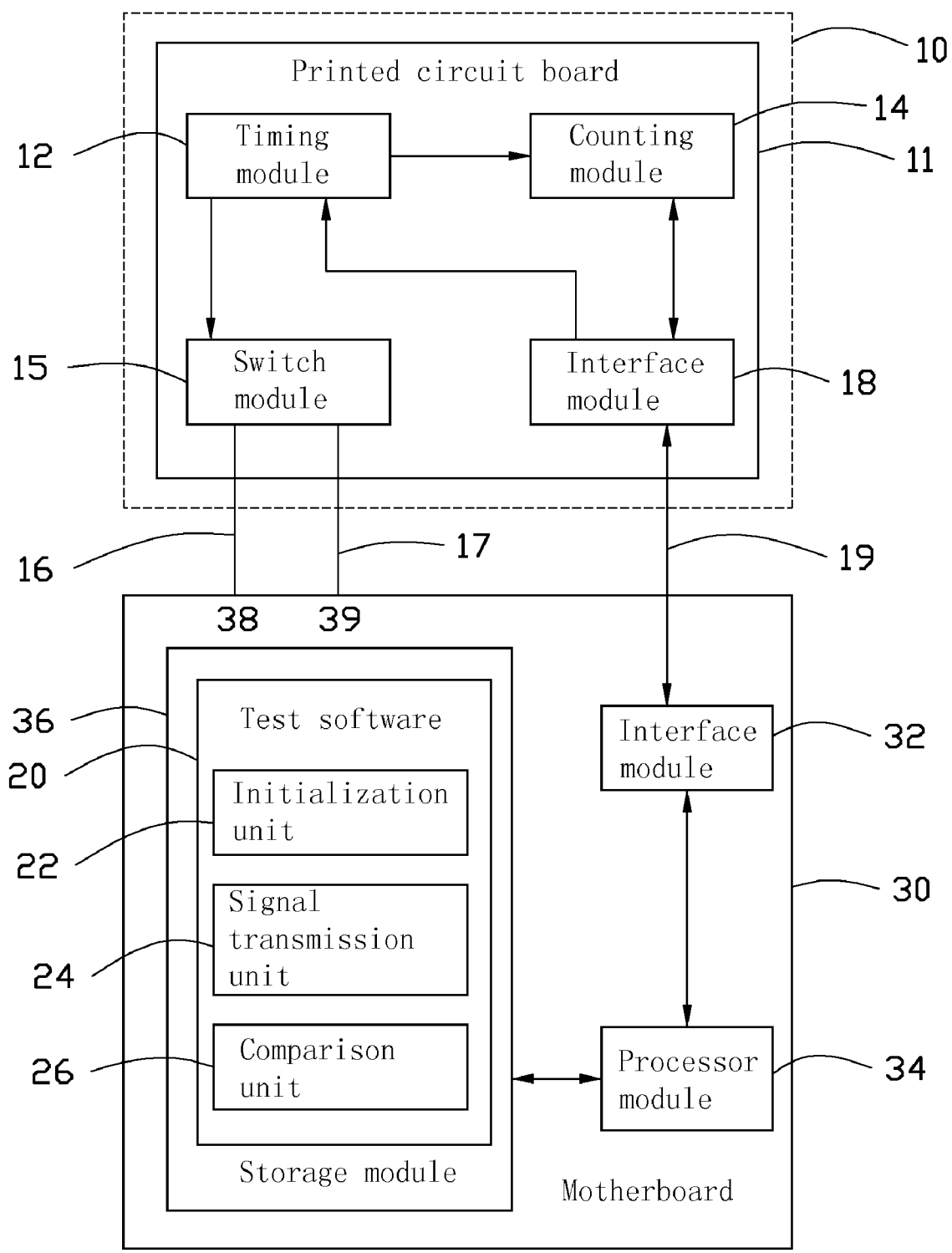
FIG. 1 is a block diagram of a system for testing sleep and wake functions of a computer in accordance with an embodiment of the present disclosure.
Figure 2:
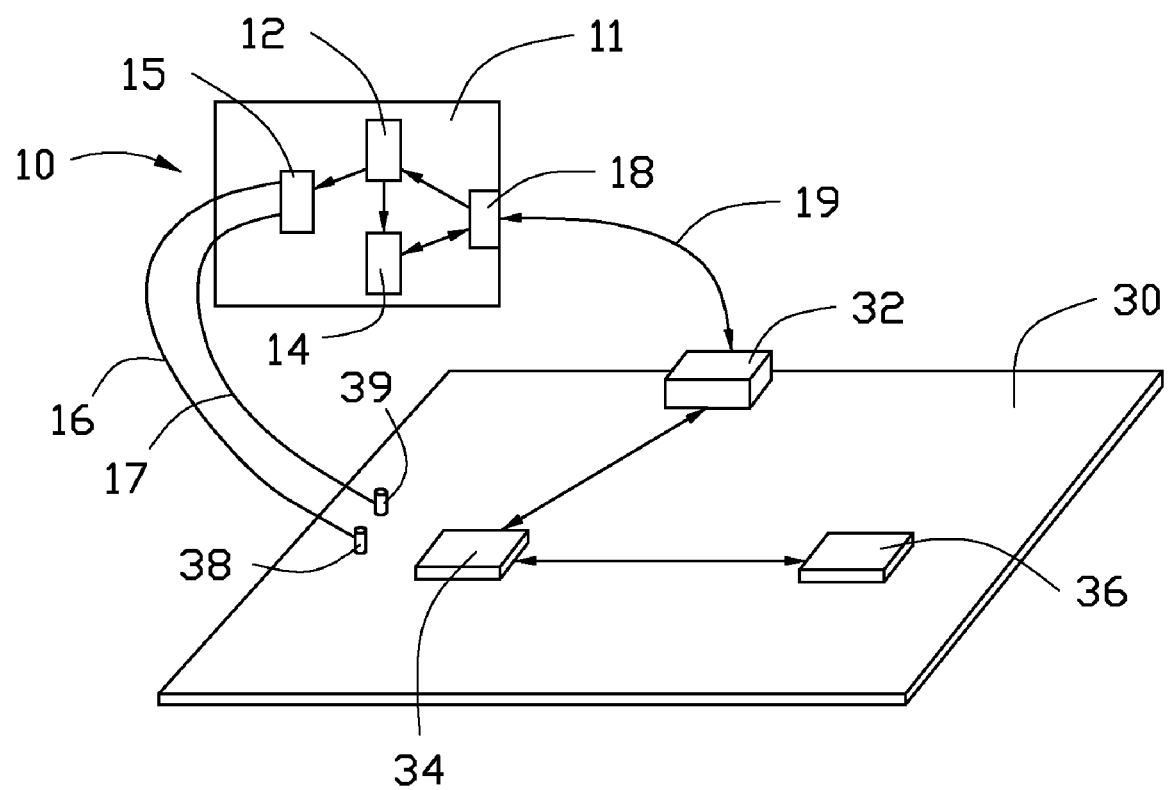
FIG. 2 is a schematic diagram of the system of FIG. 1.

Referring to FIGS. 1 and 2, an exemplary embodiment of a system for testing sleep and wake functions of a computer includes a test device 10 and a test software 20. The computer includes a motherboard 30 to be tested.

The test device 10 includes a printed circuit board (PCB) 11, a timing module 12, a counting module 14, a switch module 15, and an interface module 18. The timing module 12, the counting module 14, the switch module 15, and the interface module 18 are arranged on the PCB 11. The timing module 12 is electrically connected to the counting module 14, the switch module 15, and the interface module 18. The counting module 14 is also electrically connected to the interface module 18. The interface module 18 is connected to an interface module 32 arranged on the motherboard 30 via a cable 19, to enable the test device 10 to communicate with the motherboard 30. The cable 19 includes two cable connectors (not shown) fixed on opposite ends of the cable 19 respectively. One cable connector is connected to the interface module 18, and the other cable connector is connected to the interface module 32. In one embodiment, each of the interface modules 18 and 32 may be a universal serial bus (USB) interface, and each of the two cable connectors may be a USB connector. In other embodiments, the test device 10 and the motherboard 30 can be connected by other interface standards.

The timing module 12 is used to time a delay between parts of a test cycle as controlled by the test software 20. A test cycle consists of putting the computer to sleep, waiting for the delay time to elapse to ensure the computer has had enough time to enter a sleep state, and then waking the computer up and waiting for the delay time to elapse to ensure the computer has had time to enter a waking state. The timing module 12 begins to count down the delay time after receiving a timing signal from the test software 20 via the interface modules 32 and 18, and is further configured to transmit a counting signal to the counting module 14 and a closing signal to the switch module 15 after the delay time. The counting module 14 stores the current value and increments the value by one after receiving the counting signal, and sends the new current value to a processor module 34, such as a central processing unit, of the motherboard 30, via the interface modules 18 and 32. The switch module 15 is connected to a first signal pin 38 and a second signal pin 39 of a power button (not shown) of the computer via two wires 16 and 17. The first signal pin 38 and the second signal pin 39 are arranged on the motherboard 30. Normally, when the power button is pressed down, the first signal pin 38 is electrically connected to the second signal pin 39 to generate a power on signal, and the computer is powered on after receiving the power on signal. However, in present embodiment, the switch module 15 is configured to simulate the pushing of the power button by executing a closing operation after receiving the closing signal, in which the first signal pin 38 is electrically connected to the second signal pin 39 to generate a control signal. That is, when the switch module 15 executes a closing operation, a control signal is generated, and the value of the counting module 14 is incremented by one.

The test software 20 includes an initialization unit 22, a signal transmission unit 24, and a comparison unit 26. The initialization unit 22 is operable to set the number of test cycles and the delay time, and to write the delay time into the timing module 12. The initialization unit 22 also resets the value stored in the counting module 14 to zero at the beginning of each test. The signal transmitting unit 24 transmits the timing signal to the timing module 12. The comparison unit 26 receives the value from the counting module 14, and uses integer division to divide the value by 2 to obtain a quotient, then compares the quotient to the set number of test cycles to complete. If the quotient is less than the number of test cycles, the signal transmission unit 24 transmits a timing signal to the timing module 12 again. If the quotient is equal to the number of test cycles, the test ends. In one embodiment, the test software 20 is stored in a storage module 36, such as a hard disk, connected to the motherboard 30. The processor module 34 is connected to the storage module 36, to execute programs of the test software 20, such that functions of the initialization unit 22, the signal transmission unit 24, and the comparison unit 26 can be performed.

Figure 3:
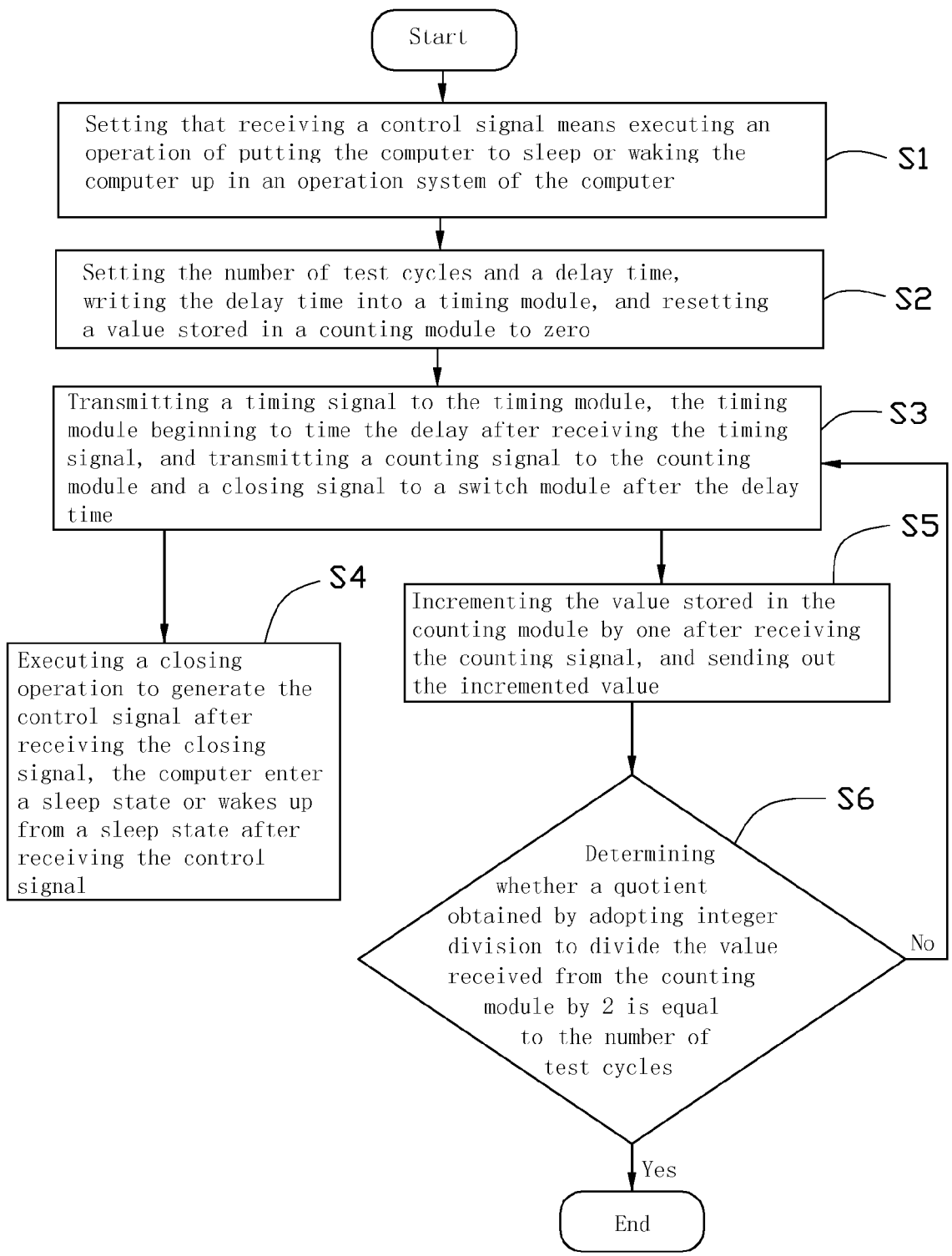
FIG. 3 is a flowchart of a method for testing sleep and wake functions of a computer in accordance with an embodiment of the present disclosure.

Referring to FIG. 3, a method for testing sleep and wake functions of a computer includes the following steps.

Some preparations are needed before the beginning of the test, such as, the first signal pin 38 is connected to the switch module 15 via the wire 16, the second signal pin 39 is connected to the switch module 15 via the wire 17, and the interface module 18 is connected to the interface module 32 via the cable 19, to enable the test device 10 to communicate with the motherboard 30.

Step S1: powering on the motherboard 30, and setting that receiving a control signal means executing an operation of putting the computer to sleep or waking the computer up, in power management of an operation system of the computer.

Step S2: running the test software 20, and setting the number of test cycles and a delay time in the initialization unit 22. The initialization unit 22 writes the delay time into the timing module 12, and resets the value stored in the counting module 14 to zero.

Step S3: the signal transmission unit 24 transmits a timing signal to the timing module 12, the timing module 12 begins to count down the delay time after receiving the timing signal, and transmits a counting signal to the counting module 14 and a closing signal to the switch module 15, after the delay time.

Step S4: the switch module 15 executes a closing operation after receiving the closing signal, the first signal pin 38 is electrically connected to the second signal pin 39, and the control signal is generated. The operation system switches between putting the computer to sleep and waking the computer up automatically, after receiving the control signal. For example, the operation system puts the computer to sleep after receiving the control signal at this time, and wakes the computer up after receiving the control signal at next time.

Step S5: the counting module 14 increments the current value by one after receiving the counting signal, and sends the new current value to the comparison unit 26.

Step S6: the comparison unit 26 receives the value from the counting module 14, and uses integer division to divide the value by 2 to obtain a quotient, then compares the quotient to the set number of test cycles. If the quotient is less than the number of test cycles, step S3 is repeated. If the quotient is equal to the number of test cycles, the test ends.

As detailed above, the system and method employ the test software 20 cooperating with the test device 10 to test sleep and wake functions of the computer automatically, with advantageous of labor and time saving.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A system for testing sleep and wake functions of a computer comprising a motherboard, the system comprising:
    a test device communicating with the motherboard, the test device comprising a timing module, a counting module, and a switch module; and
    a test software installed on the motherboard, the test software comprising:
        an initialization unit to set the number of test cycles and a delay time, write the delay time into the timing module, and reset a value stored in the counting module to zero;
        a signal transmission unit to transmit a timing signal to the timing module, wherein the timing module begins to count down the delay time after receiving the timing signal, and transmits a counting signal to the counting module and a closing signal to the switch module after the delay time, the counting module increments the value by one after receiving the counting signal, and sends out the incremented value; and
        a comparison unit to use integer division to divide the value received from the counting module by 2 to obtain a quotient, and compare the quotient to the number of test cycles, wherein if the quotient is less than the number of test cycles, the signal transmission unit transmits a timing signal to the timing module again, and if the quotient is equal to the number of test cycles, the test ends;
    wherein the switch module is connected to a first signal pin and a second signal pin of the motherboard, and an operation system of the computer sets that receiving a control signal means executing an operation of putting the computer to sleep or waking the computer up; and
    wherein the switch module executes a closing operation after receiving the closing signal, the first signal pin is electrically connected to the second signal pin to generate the control signal, the computer enter a sleep state or wakes up from a sleep state after receiving the control signal.

2. The system of claim 1, wherein the test device further comprises an interface module to connect to the motherboard.

3. The system of claim 2, wherein the interface module is connected to the motherboard via a cable.

4. The system of claim 3, wherein the interface module is a universal serial bus (USB) interface, and the cable includes a USB connector to engage with the USB interface.

5. The system of claim 2, wherein the test device further comprises a printed circuit board (PCB); the timing module, the counting module, the switch module, and the interface module are arranged on the PCB; the timing module is electrically connected to the counting module, the switch module, and the interface module; the counting module is electrically connected to the interface module.

6. The system of claim 1, wherein the delay time set by the initialization unit is to ensure the computer has enough time to enter a sleep state or enter a waking state.

7. The system of claim 1, wherein the test software is stored in a storage module of the motherboard connected to a processor module, with the test software executed by the processor module.

8. The system of claim 1, wherein the switch module is connected to the first signal pin and the second signal pin via two wires respectively.

9. A method for testing sleep and wake functions of a computer comprising a motherboard, the method comprising:
    providing a test device comprising a timing module, a counting module, and a switch module;
    setting receiving a control signal means executing an operation of putting the computer to sleep or waking the computer up in an operation system of the computer;
    setting the number of test cycles and a delay time;
    writing the delay time into the timing module and resetting a value stored in the counting module to zero;
    transmitting a timing signal to the timing module, wherein the timing module begins to count down the delay time after receiving the timing signal, and transmits a counting signal to the counting module and a closing signal to the switch module after the delay time;
    executing a closing operation to generate the control signal after receiving the closing signal, wherein the computer enters into a sleep state or wakes up from a sleep state after receiving the control signal, the counting module increments the value by one after receiving the counting signal, and sends out the incremented value; and
    using integer division to divide the value received from the counting module by 2 to obtain a quotient, and comparing the quotient to the number of test cycles, wherein if the quotient is less than the number of test cycles, transmitting a timing signal to the timing module again, and if the quotient is equal to the number of test cycles, the test ends.

10. The method of claim 9, wherein setting the delay time is to ensure the computer has enough time to enter a sleep state or enter a waking state.

11. The method of claim 9, wherein when the closing operation is executed by the switch module, a first signal pin and a second signal pin arranged on the motherboard and connected to the switch module are electrically connected, to generate the control signal.

* * * * *